Aug. 30, 1938.  G. LE R. SPENCER, JR  2,128,380
RECOVERY OF VALUES FROM ZINC CONCENTRATES
Filed June 28, 1937
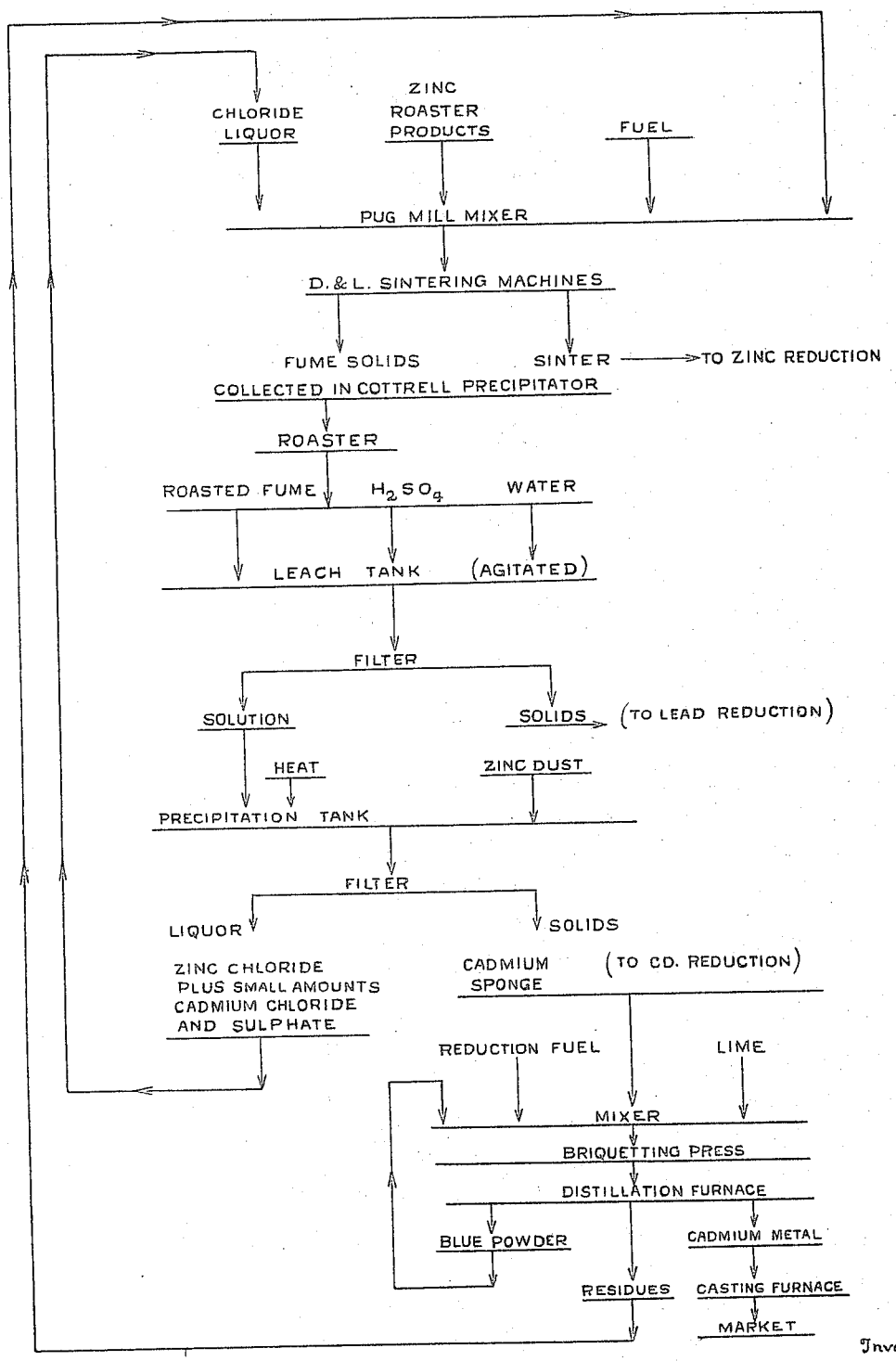

/ Patented Aug. 30, 1938

2,128,380

UNITED STATES PATENT OFFICE 2,128,380

RECOVERY OF VALUES FROM ZINC CONCENTRATES

George Le Roy Spencer, Jr., St. Louis, Mo., assignor to American Zinc, Lead & Smelting Company, St. Louis, Mo., a corporation of Maine Application June 28, 1937, Serial No. 150,812

13 Claims. (Cl. 75—21)

The present invention relates to the recovery of values from zinc concentrates, and more particularly to the recovery of lead, cadmium, zinc and chlorine values that are volatilized during the sintering of zinc concentrates.

In calcining zinc concentrates by a suitable roasting operation, the fumes passing off from the calcining apparatus carry with them certain zinc, lead and cadmium values which should not be allowed to go to waste. Moreover, when the products from the roasting or calcining operation are sintered, using chloride liquor in the sintering operation, the fumes from the sintering machines carry with them zinc, lead, cadmium and chlorine values which it is desirable to recover.

The object of the present invention is to effect the recovery of the lead, cadmium and zinc and to prevent the loss of the chlorine by introducing it into the chloride liquor used during the sintering operation.

The invention will be described in connection with the accompanying flow sheet. The zinc concentrates are roasted in any suitable type of muffling roasters, such as 12-hearth Herreshoff roasters. The lead and cadmium carried off by the calcining fumes from such roasters are recovered in solid form in any suitable way as by a Cottrell precipitator, and such recovered solids, together with the calcines from the roaster are mixed with a suitable fuel and chloride liquor in a pug mill mixer from which the mixture is passed to a sintering machine, such for example, as the well known Dwight & Lloyd sintering machine. The resulting sinter is passed to zinc reduction in the usual or any suitable way. The sinter fumes carry chlorides of zinc, lead and cadmium, and also chlorine and other matter volatilized during the sintering operation. These sinter fumes are collected and reduced to solid form, which by preference is done in a Cottrell precipitator. The resulting collected solids are then oxidized. This oxidation may be, and preferably is, effected by roasting the collected solids in a suitable roasting apparatus at a temperature of from 200° C. to 450° C., or higher. In the above indicated temperature range the time of roasting can vary from five or ten minutes to as high as an hour, depending upon the concentrations of certain harmful impurities. That is, the actual roasting process, both as far as temperature and time are concerned, is not a close one, but can be varied within the above limits with the production of satisfactory oxidized solid.

After being oxidized, the collected solids are mixed with water and sulphuric acid in a suitable tank, under agitation, whereby the collected solids, with the exception of the lead, are passed into solution, and lead is then precipitated from the solution as an insoluble lead sulphate. The water acts to dissolve the water-soluble constituents of the collected solid, and the sulphuric acid dissolves as sulfates all water-insoluble zinc and cadmium values and reacts with the lead components to form lead sulphate which is insoluble in the solution. The oxidation of the solids, as by an oxidizing roast, is for the purpose of oxidizing sulphur dioxide and other reducing agents in the solution to prevent the recurrence of certain harmful reactions in the subsequent step.

After agitation varying from one to three hours, the insoluble lead sulphate is separated from the solution containing the zinc, cadmium and chlorine values by filtration, as on a plate and frame press, and washed with plant water to remove therefrom all the soluble zinc and cadmium sulphates and chlorides that can be removed economically, after which it is available for further treatment for recovery of the lead. This lead residue is of high grade and compares well with commercial grades of lead ore. It contains a high percentage of lead sulphate and can be used with no difficulty in the place of other standard types of lead ores for either the production of lead metal or lead pigments.

The solution obtained from this step, free from all but a trace of lead, is transferred to another suitable tank where it is acidified by the addition of enough 60° Baumé sulphuric acid to render the solution approximately 10% acid. The temperature of the solution is then raised to approximately 80° C. and maintained at this point under vigorous agitation, and finely divided zinc dust containing approximately 95% zinc and 0.20% lead and 0.20% cadmium is slowly added. The cadmium values of the solution are precipitated while the zinc remains in solution, since the finely divided zinc dust reacts with the soluble cadmium salts and forms a finely divided cadmium metal (commonly called cadmium sponge) and the corresponding soluble zinc salt. The precipitated cadmium sponge is then separated from the solution in a suitable filter press, leaving a clear filtrate liquor containing zinc chloride and small amounts of cadmium chloride and sulphates. These are not lost, since this clear, filtrate liquor is returned for use in the sintering operation via the pug mill mixer, and the cadmium content thereof will be volatilized in the sintering machine and will be recovered in the Cottrell precipitator to which the sintering fumes are conducted. The zinc content of this liquor is converted to zinc oxide in the sintering operation and is retained in the sinter.

It is during the cadmium precipitating operation that the harmful reactions above referred to would occur but for the oxidation of the solids collected from the sintering fumes. These side reactions consist primarily of the reactions between soluble cadmium chloride, sulphurous acid and the added zinc dust which would form a mixture of cadmium sulphide and sulphur. These two components are insoluble, and hence would be precipitated out of the solution. It is necessary to prevent this particular reaction because the resulting cadmium sulphide would not be suitable for the production of metallic cadmium by the present process.

By oxidizing the solids collected from the sintering fumes, as by subjecting them to an oxidizing roast, all the sulphites are decomposed, all the $SO_2$ is driven off and also other volatile reducing agents, such as some of the sulphur chlorides, are volatilized, with the result that the harmful side reactions just mentioned do not occur in the precipitating step and the cadmium is precipitated as cadmium sponge which can be readily filtered from the solution and is in suitable shape for the subsequent production of metallic cadmium therefrom.

The cadmium sponge may then be passed to a suitable mixer and mixed with a suitable reduction fuel and an alkaline earth metal oxide, such as lime, after which it is formed into briquettes and passed to a distillation furnace, and the cadmium metal distilled therefrom. During this distillation operation approximately 20% of the cadmium sponge collects in the condensers of the distillation furnace as a fine metallic cadmium powder which will not coalesce along with cadmium metal. This product is termed "Blue Powder". This "Blue Powder" is returned to the mixing mill where it is mixed with fresh supplies of cadmium sponge and lime or other alkaline earth metal oxide to be formed into briquettes and distilled, as above described. There remains in the distillation furnace, after the cadmium metal and "Blue Powder" have been removed, certain residues which contain small amounts of cadmium, zinc and lead. These cadmium, zinc and lead values are subsequently recovered by conveying the residue to the pug mill mixer employed for mixing fuel and chloride liquor with the calcining products to be passed to the sintering machine.

It will thus be seen that approximately all of the zinc, lead, cadmium and chlorine values are recovered, the lead, cadmium and zinc in metal form and the chlorine used in the cyclic operation, with no loss of chlorine other than that due to mere mechanical defects during the operation, which loss may be compensated for by small additions of zinc or other chloride to the chloride liquor, as occasion may require.

While for the purpose of oxidizing the solidified sinter fumes, an oxidizing roast has been specifically described, it will be understood that the object of this roasting is the oxidation of these solids, and any other suitable means of effecting this oxidation may be employed. Furthermore, while lime has been specifically mentioned as the alkaline earth metal oxide, it will be understood that any other suitable alkaline earth metal oxides, such for example, as calcium oxide, barium oxide, magnesium oxide or strontium oxide, may be employed. It is also to be understood that while for the purpose of describing the invention, it has been set forth in specific detail, such details are not designed to define the limits of the invention, reference being had to the appended claims for this purpose.

What is claimed is:

1. The process of recovering values from zinc ore concentrates containing lead, cadmium and other impurities, which consists in calcining the concentrates, whereby lead and cadmium are removed therefrom in the calcining fumes, collecting lead and cadmium in solid form from said fumes, sintering the calcine while adding zinc chloride, collecting the sinter fumes in solid form, subjecting the collected solids to an oxidizing roast, then mixing the oxidized solids with water and sulphuric acid under agitation, filtering lead from the solution, heating the clear filtrate to approximately 80° C. and adding zinc dust thereto, filtering therefrom precipitated cadmium sponge, returning the zinc chloride liquor from the filter press for reuse in sintering operations, mixing the cadmium sponge with a reduction fuel and an alkaline earth metal oxide, distilling metallic cadmium from the sponge and returning the residue to the sintering machine.

2. The process of recovering values from zinc ore concentrates containing lead, cadmium and other impurities, which consists in calcining the concentrates, whereby lead and cadmium are removed therefrom in the calcining fumes, collecting lead and cadmium in solid form from said fumes, sintering the calcine while adding zinc chloride, collecting the sinter fumes in solid form, oxidizing the collected solids, then mixing the oxidized solids with water and sulphuric acid under agitation, filtering lead from the solution, heating the clear filtrate to approximately 80° C. and adding zinc dust thereto, filtering therefrom precipitated cadmium sponge, returning the zinc chloride liquor from the filter press for reuse in in sintering operations, mixing the cadmium sponge with a reduction fuel and an alkaline earth metal oxide, distilling metallic cadmium from the sponge and returning the residue to the sintering machine.

3. In a process of recovering values from zinc concentrates, the steps of calcining the concentrates, sintering resulting calcines, collecting the sinter fumes in solid form, subjecting the collected solids to an oxidizing roast, subjecting the oxidized solids to a solvent for all except the lead, precipitating the lead from the solution, heating the clear filtrate to approximately 80° C. and adding zinc dust thereto, and filtering therefrom the precipitated cadmium.

4. In a process of recovering values from zinc concentrates, the steps of calcining the concentrates, sintering the resulting calcines, collecting the sinter fumes in solid form, roasting the collected solids at a temperature not less than 200° C., subjecting the roasted solids to a solvent for all but the lead, precipitating the lead from the solution, heating the clear filtrate to approximately 80° C. and adding zinc dust thereto, and filtering therefrom the precipitated cadmium.

5. In a process of recovering values from zinc concentrates, the steps of calcining the concentrates, sintering resulting calcines, collecting the sintering fumes in solid form, subjecting the said collected solids to an oxidizing roast, passing all the roasted solids except the lead into solution, precipitating lead from said solution, heating the clear filtrate to approximately 80°

C. and adding zinc dust thereto, and filtering therefrom the precipitated cadmium.

6. In a process of recovering values from zinc concentrates, the steps of calcining the concentrates, sintering resulting calcines, collecting the sinter fumes in solid form, subjecting the said collected solids to oxidation, passing all the roasted solids except the lead into solution, precipitating the lead from said solution, heating the clear filtrate to approximately 80° C. and adding zinc dust thereto, and filtering therefrom the precipitated cadmium.

7. In a process of recovering values from zinc concentrates, the steps of calcining and sintering the concentrates, collecting the sinter fumes in solid form, subjecting the collected solids to oxidation, and then separating the lead from the cadmium in a sulphuric acid solution.

8. In a process of recovering values from zinc concentrates, the step of calcining and sintering the concentrates, collecting the sinter fumes in solid form, subjecting the collected solids to an oxidizing roast, and then separating the lead from the cadmium in a sulphuric acid solution.

9. In a process of separating lead from cadmium in sinter fumes of calcined zinc concentrates, the steps of reducing the sinter fumes to solid form, roasting the solids, subjecting the roasted solids to the action of a solvent for all except the lead, removing the lead from the solution, and then precipitating cadmium from the solution.

10. In a process of separating lead from sinter fumes of calcined zinc concentrates, the steps of reducing said fumes to solid form, subjecting the solids to oxidation, then subjecting the solids to a solvent for all but the lead, and then separating the lead from the solution.

11. In a process of separating lead from cadmium in sinter fumes of calcined zinc concentrates, the steps of reducing the lead and cadmium in said fumes to solid form, roasting the collected solids, subjecting the roasted solids to the action of a sulphuric acid solution, precipitating lead from the solution, heating the clear filtrate and adding zinc dust thereto, whereby cadmium is precipitated therein, and then separating the precipitated cadmium from the solution.

12. In a process of separating lead from cadmium in sinter fumes of calcined zinc concentrates, the steps of reducing the lead and cadmium and other matter in said fumes to solid form, roasting the collected solids, subjecting the roasted solids to the action of a sulphuric acid solution, precipitating lead from the solution, heating the clear filtrate and adding zinc dust thereto, whereby cadmium is precipitated therein, then separating the precipitated cadmium from the solution thus leaving a chloride liquor containing zinc, and returning the chloride liquor to the sintering operation.

13. The process of recovering values from zinc ore concentrates containing lead, cadmium and other impurities, which consists in calcining the concentrates, whereby lead and cadmium are removed therefrom in the calcining fumes, collecting lead and cadmium in solid form from said fumes, sintering the calcines while adding zinc chloride, collecting in solid form lead, cadmium, zinc, chlorine and other matter volatilized during the sintering, subjecting the collected solids to a roasting temperature of not less than 200° C., then mixing the roasted solids with water and sulphuric acid under agitation, filtering lead from the solution, heating the clear filtrate to approximately 80° C. and adding zinc dust thereto, filtering therefrom precipitated cadmium sponge leaving a chloride liquor containing zinc, and returning the chloride liquor from the filter press for reuse in sintering operations.

GEORGE LE ROY SPENCER, Jr.